(12) United States Patent
Cho

(10) Patent No.: US 9,924,077 B2
(45) Date of Patent: Mar. 20, 2018

(54) CAMERA FOR VEHICLE AND CONTROL METHOD FOR THE SAME

(71) Applicant: HYUNDAI MOBIS Co., Ltd., Yongin-si, Gyeonggi-do (KR)

(72) Inventor: Heung Rae Cho, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 300 days.

(21) Appl. No.: 14/957,138

(22) Filed: Dec. 2, 2015

(65) Prior Publication Data

US 2016/0173737 A1 Jun. 16, 2016

(30) Foreign Application Priority Data

Dec. 11, 2014 (KR) ........................ 10-2014-0178596

(51) Int. Cl.
*H04N 5/225* (2006.01)
*B60R 11/04* (2006.01)
*H04N 7/18* (2006.01)
*B60R 1/00* (2006.01)
*G01L 17/00* (2006.01)
*B60C 23/04* (2006.01)

(52) U.S. Cl.
CPC ......... *H04N 5/225* (2013.01); *B60C 23/0418* (2013.01); *B60R 1/00* (2013.01); *B60R 11/04* (2013.01); *G01L 17/005* (2013.01); *H04N 7/181* (2013.01); *B60R 2300/402* (2013.01); *B60R 2300/406* (2013.01); *B60R 2300/70* (2013.01)

(58) Field of Classification Search
CPC ...... H04N 5/225; B60R 11/04; B60C 23/0418
See application file for complete search history.

(56) References Cited

U.S. PATENT DOCUMENTS

2003/0041329 A1 2/2003 Bassett
2005/0270152 A1 12/2005 Harumoto et al.
2011/0221587 A1* 9/2011 Katou ................ B60C 23/0408
340/443

FOREIGN PATENT DOCUMENTS

| CN | 1702616 A | 11/2005 |
| CN | 102821037 A | 12/2012 |
| CN | 202738026 U | 2/2013 |
| JP | 2001-180239 A | 7/2001 |

OTHER PUBLICATIONS

Aug. 1, 2017, Chinese Office Action for related CN application No. 201510900194.5.

* cited by examiner

*Primary Examiner* — Nam Pham
(74) *Attorney, Agent, or Firm* — Paratus Law Group, PLLC

(57) ABSTRACT

The present invention relates to a camera for a vehicle and a control method for the same and an exemplary embodiment of the present invention provides a camera for a vehicle which is provided in any one of a plurality of designated installation positions of the vehicle, including: an image sensor which generates a driving image; a receiving unit which receives a plurality of RF signals which are transmitted from a TPMS sensor unit which detects states of a plurality of tires included in the vehicle; and a position determining unit which determines which position among the plurality of installation positions is a position where the camera is installed, based on the plurality of RF signals which is received by the receiving unit.

12 Claims, 7 Drawing Sheets

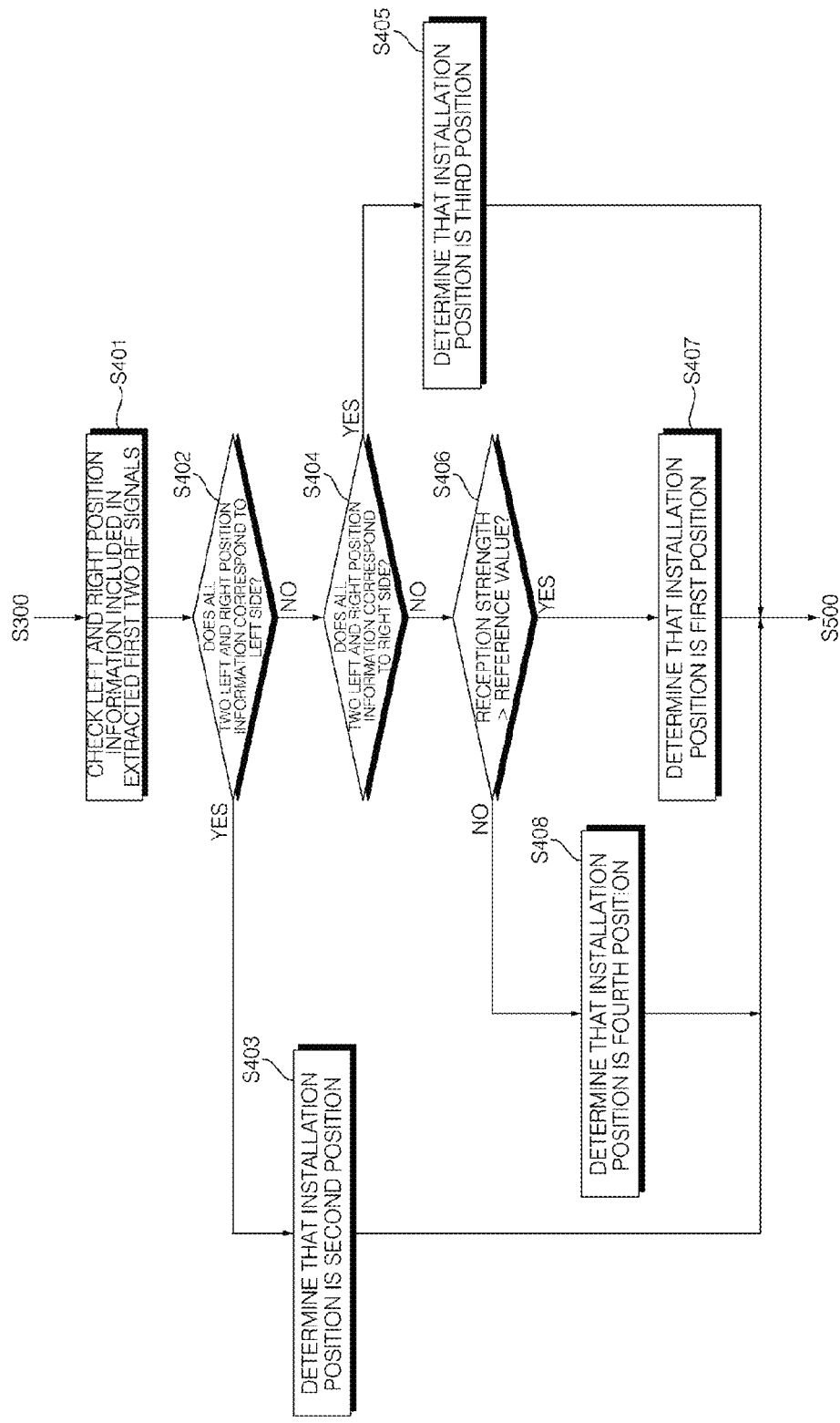

CAMERA FOR VEHICLE AND CONTROL METHOD FOR THE SAME

CROSS-REFERENCE TO RELATED APPLICATIONS

The present application claims priority to Korean Patent Application Number 10-2014-0178596 filed Dec. 11, 2014, the entire contents of which application is incorporated herein for all purposes by this reference.

TECHNICAL FIELD

The present invention relates to a camera for a vehicle and a control method for the same, and more particularly, to a camera for a vehicle which may determine an installed location of the camera in the vehicle by itself using an RF signal transmitted from a TPMS sensor and a control method for the same.

BACKGROUND

Generally, when several cameras are installed in a vehicle, Ethernet cameras which have relatively simple interfaces are used and a plurality of Ethernet cameras is connected to an electronic control unit (ECU) through an Ethernet switch.

In this case, the ECU is connected to an upper link of the Ethernet switch to control the camera or receive image data from the camera while communicating with a plurality of cameras which is connected to a lower link of the Ethernet switch.

However, the camera for a vehicle of the related art has a drawback in that transmission of an image of the camera needs to be interrupted during a switching process which confirms a location of the camera or delay for stabilization occurs in every circuit when power is switched to determine the location of the camera. Further, similarly to the Ethernet network described above, when various application systems which are connected to one network share the same camera image resource, location information of the camera may not be shared.

SUMMARY

The present invention has been made in an effort to provide a camera for a vehicle which determines an installation location of a camera in a vehicle by transmitting or receiving an RF signal between the camera and a TPMS sensor and a control method for the same.

Objects of the present invention are not limited to the above-mentioned objects, and other objects, which are not mentioned above, can be clearly understood by those skilled in the art from the following descriptions.

An exemplary embodiment of the present invention provides a camera for a vehicle which is provided in any one of a plurality of designated installation positions of the vehicle including: an image sensor which generates a driving image; a receiving unit which receives a plurality of RF signals which is transmitted from a TPMS sensor unit which detects states of a plurality of tires included in the vehicle; and a position determining unit which determines a position where the camera is installed, among the plurality of installation positions, based on the plurality of RF signals which is received by the receiving unit.

The camera may further include a memory which stores the driving image and information indicating the determined installation position.

The camera may further include a communication unit which provides the driving image and the information indicating the determined installation position to an image display device of the vehicle.

The communication unit may provide the driving image and information on the determined installation position to the image display device of the vehicle using at least one of a controller area network (CAN), a low-voltage differential signaling (LVDS), and the Ethernet.

The vehicle may include a first tire which is located at a front left side, a second tire which is located at a front right side, a third tire which is located at a rear left side, and a fourth tire which is located at a rear right side, the TPMS sensor unit may include a first detecting sensor which is provided in the first tire and transmits a first RF signal including state information of the first tire; a second detecting sensor which is provided in the second tire and transmits a second RF signal including state information of the second tire, a third detecting sensor which is provided in the third tire and transmits a third RF signal including state information of the third tire; and a fourth detecting sensor which is provided in the fourth tire and transmits a fourth RF signal including state information of the fourth tire, the first to fourth RF signals may include left and right position information and be transmitted with the same strength, and the plurality of installation positions may be a first position between the first tire and the second tire, a second position between the first tire and the third tire, a third position between the second tire and the fourth tire, and a fourth position between the third tire and the fourth tire.

The receiving unit may measure RSSIs of the first to fourth RF signals, and the position determining unit may extract first two RF signals in the descending order of RSSI among the first to fourth RF signals and determine a position where the camera is installed, among the plurality of installation positions using the two extracted RF signals.

When all the left and right position information included in the first two RF signals which are extracted in the descending order of RSSI correspond to the left side, the position determining unit may determine that the installation position of the camera is the second position and when all the left and right position information included in the first two RF signals which are extracted in the descending order of RSSI corresponds to the right side, the position determining unit may determine that the installation position of the camera is the third position.

When the left and right position information included in any one of the first two RF signals which are extracted in the descending order of RSSI corresponds to the left side and the left and right position information included in the other one corresponds to the right side, if the first two RF signals which are extracted in the descending order of RSSI have a first strength, the position determining unit may determine that the installation position of the camera is the first position and if the first two RF signals which are extracted in the descending order of RSSI have a second strength, the position determining unit may determine that the installation position of the camera is the fourth position.

The camera may further include an encryption unit which encrypts the RF signal.

Another exemplary embodiment of the present invention provides, a control method of a camera for a vehicle, including: receiving a plurality of RF signals which are transmitted from a TPMS sensor unit which detects states of a plurality of tires included in the vehicle; measuring reception strengths of the plurality of RF signals; extracting first two RF signals, among the plurality of RF signals, in the descending order of reception strength;

determining a position where the camera is installed, among a plurality of designated installing positions, based on the first two RF signals which are extracted in the descending order of reception strength; and providing information indicating the determined installation position to the vehicle.

When information indicating the determined installation position is provided to the image display device of the vehicle, image data photographed by the camera may be also provided.

The vehicle may include a first tire which is located at a front left side, a second tire which is located at a front right side, a third tire which is located at a rear left side, and a fourth tire which is located at a rear right side, the TPMS sensor unit may include a first detecting sensor which is provided in the first tire and transmits a first RF signal including state information of the first tire; a second detecting sensor which is provided in the second tire and transmits a second RF signal including state information of the second tire, a third detecting sensor which is provided in the third tire and transmits a third RF signal including state information of the third tire; and a fourth detecting sensor which is provided in the fourth tire and transmits a fourth RF signal including state information of the fourth tire, the first to fourth RF signals may include left and right position information and be transmitted with the same strength, and the plurality of installation positions may include a first position between the first tire and the second tire, a second position between the first tire and the third tire, a third position between the second tire and the fourth tire, and a fourth position between the third tire and the fourth tire.

Other detailed matters of the embodiments are included in the detailed description and the drawings.

According to the camera for a vehicle and the control method for the same of the present invention, as described above, there are one or more effects as follows.

First, regardless of an installation location of the camera in the vehicle, the camera determines the installation location thereof by itself and provides the determined installation location information to the vehicle.

Second, there is no need to separately manufacture a cable pin map for each of the cameras which are installed in different locations or manage the cameras with different part numbers, so that the manufacturing process may be simplified.

Third, an operator does not need to consider the camera installation location for an assembling process, so that the assembling processing may be simplified.

Fourth, when a plurality of cameras is provided in the vehicle, the number of parts required to recognize a signal for every installation location of each camera may be reduced.

The effects of the present invention are not limited to the aforementioned effects, and other effects, which are not mentioned above, will be apparently understood by a person skilled in the art from the recitations of the claims.

BRIEF DESCRIPTION OF THE DRAWINGS

FIGS. 4 and 5 are flow charts illustrating a control method of a camera for a vehicle according to an exemplary embodiment of the present invention.

DETAILED DESCRIPTION

Figure 1:
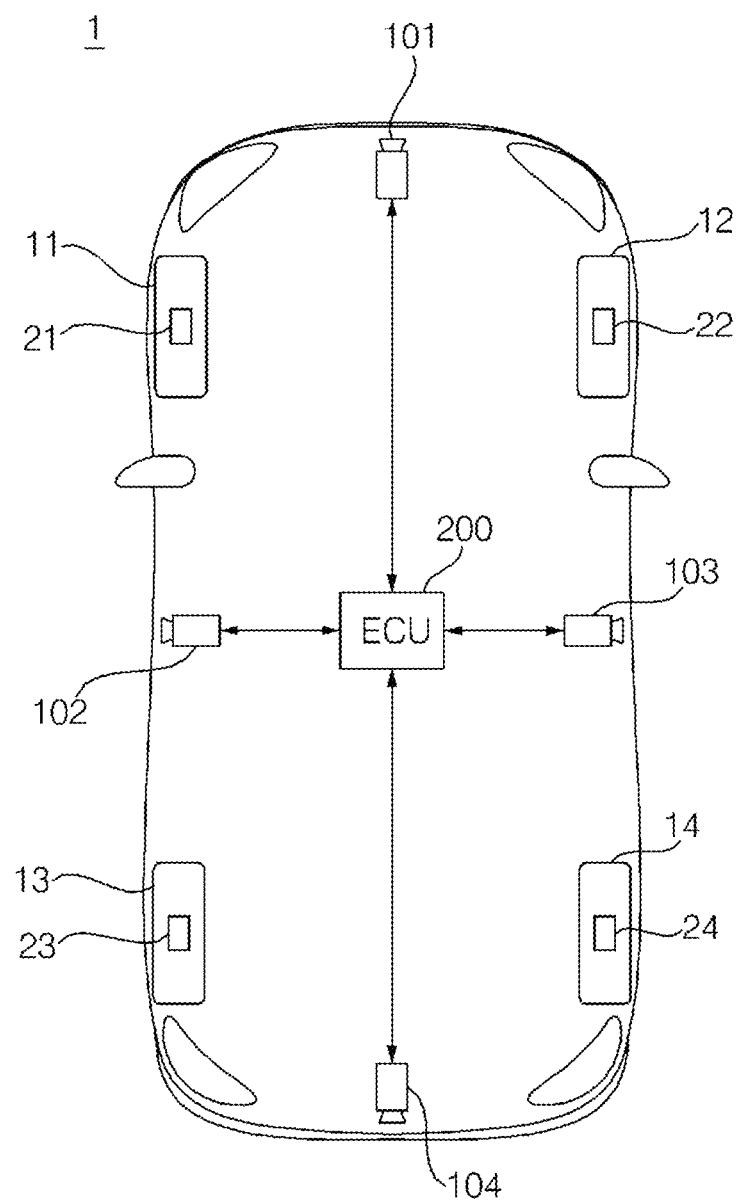
FIG. 1 is an exemplary view schematically illustrating a tire, a TPMS sensor unit, and a camera which are provided in a vehicle according to an exemplary embodiment of the present invention.

Advantages and characteristics of the present invention and a method of achieving the advantages and characteristics will be clear by referring to exemplary embodiments described below in detail together with the accompanying drawings. However, the present invention is not limited to exemplary embodiments disclosed herein but will be implemented in various different forms. The exemplary embodiments are provided by way of example only so that a person of ordinary skilled in the art can fully understand the disclosures of the present invention and the scope of the present invention. Therefore, the present invention will be defined only by the scope of the appended claims. Like reference numerals indicate like elements throughout the specification.

Hereinafter, the present invention will be described with reference to the drawings for explaining a camera for a vehicle and a control method for the same according to embodiments of the present invention.

A preferred camera for a vehicle and a control method for the same may be modified by those skilled in the art and the exemplary embodiment is a camera for a vehicle and a control method for the same.

FIG. 1 is an exemplary view schematically illustrating a tire, a TPMS sensor unit, and a camera which are provided in a vehicle 1 according to an exemplary embodiment of the present invention.

Referring to FIG. 1, the vehicle 1 may include a plurality of tires. For example, the plurality of tires may include a first tire 11 which is located at a front left side, a second tire 12 which is located at a front right side, a third tire 13 which is located at a rear left side, and a fourth tire 14 which is located at a rear right side. Hereinafter, for the convenience of description, it is assumed that an interval between the first tire 11 and the second tire 12 is the same as an interval between the third tire 13 and the fourth tire 14 and an interval between the first tire 11 and the third tire 13 is the same as an interval between the second tire 12 and the fourth tire 14.

The vehicle 1 may include a TPMS sensor unit which detects states of the plurality of tires. For example, the TPMS sensor unit may include first to fourth detecting sensors 21 to 24 which are provided in the first to fourth tires 11 to 14, respectively.

Specifically, the first detecting sensor 21 is provided in the first tire 11 and transmits a first RF signal including state information of the first tire 11.

The second detecting sensor 22 is provided in the second tire 12 and transmits a second RF signal including state information of the second tire 12.

The third detecting sensor 23 is provided in the third tire 13 and transmits a third RF signal including state information of the third tire 13.

The fourth detecting sensor 24 is provided in the fourth tire 14 and transmits a fourth RF signal including state information of the fourth tire 14.

Here, the state information of the tires 11 to 14 which is detected by the detecting sensors 21 to 24 may include an air pressure and a temperature.

In this case, the first to fourth RF signals may be transmitted with the same strength. For example, an RSSI of the first RF signal and an RSSI of the second RF signal which are measured with the same distance from the first detecting sensor 21 and the second detecting sensor 22 may have the same value. Further, strengths of the first to fourth RF signals may be gradually decreased as a transmitting distance is increased.

The first to fourth RF signals may include left and right position information. For example, when the vehicle 1 goes straight, the first tire 11 and the third tire 13 rotate in a first direction and the second tire 12 and the fourth tire 14 rotate in a second direction which is opposite to the first direction. In this case, the left and right position information which is included in the first RF signal and the third RF signal which are transmitted from the first detecting sensor 21 and the third detecting sensor 23 which are provided in the first tire 11 and the third tire 13 which rotate in the first direction may correspond to the left side. That is, the first detecting sensor 21 and the third detecting sensor 23 may load information indicating that the sensors 21 and 23 are provided in the tires which are located at a left side from a center line of the vehicle 1 (that is, the first tire 11 or the third tire 13) to the RF signal.

In this case, the left and right position information which is included in the second RF signal and the fourth RF signal which are transmitted from the second detecting sensor 22 and the fourth detecting sensor 24 which are provided in the second tire 12 and the fourth tire 14 which rotate in the second direction may correspond to the right side. That is, the second detecting sensor 22 and the fourth detecting sensor 24 may load information indicating that the sensors 22 and 24 are provided in the tires which are located at a right side from a center line of the vehicle 1 (that is, the second tire 12 or the fourth tire 14) to the RF signal.

The camera 100 may be installed in any one of a plurality of designated installation locations of the vehicle 1. Further, a plurality of cameras 100 may be installed in the vehicle 1. For example, a first camera 101 is installed in front of the vehicle 1, a fourth camera 104 is installed at a rear side of the vehicle 1, a second camera 102 is installed at the left side of the vehicle 1, and a third camera 103 is installed at the right side of the vehicle 1.

However, the above description is an example and more or less tires may be included in the vehicle 1 depending on the type of the vehicle, in a different manner from FIG. 1.

An electronic control unit (ECU) 200 may be included in the vehicle 1 and the cameras 100 may be wirely or wirelessly connected to the ECU 200 of the vehicle 1, as illustrated in the drawing. Here, the ECU 200 may control various devices including an engine, a transmission, and an ABS of the vehicle 1.

Figure 2:
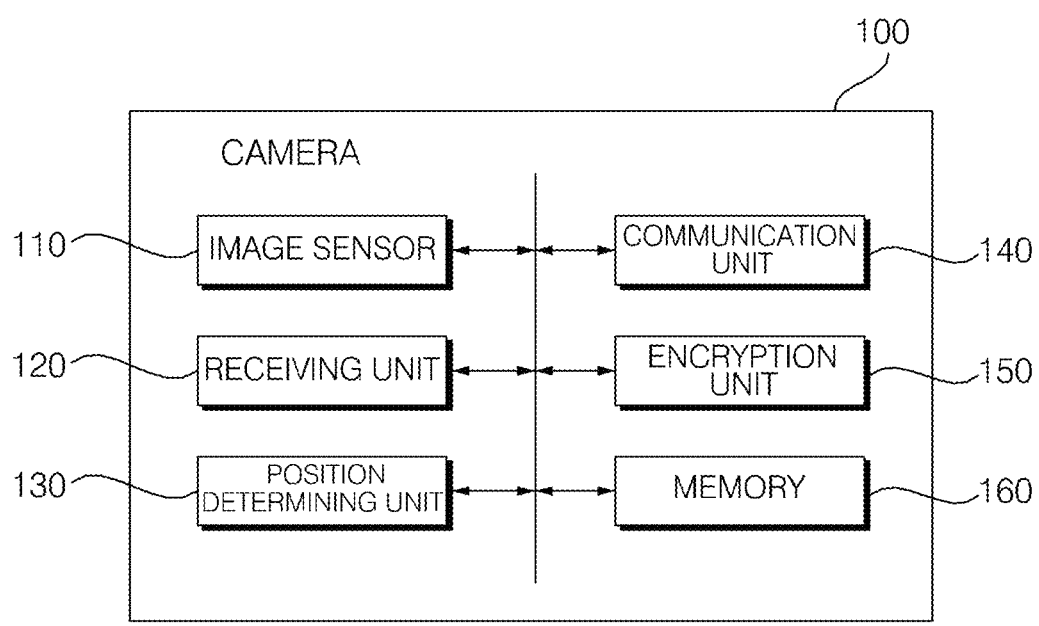
FIG. 2 is a block diagram of a camera for a vehicle according to an exemplary embodiment of the present invention.

FIG. 2 is a block diagram of a camera 100 for a vehicle according to an exemplary embodiment of the present invention.

Referring to FIG. 2, the camera 100 for a vehicle according to an exemplary embodiment of the present invention includes an image sensor 110 and a receiving unit 120. Further, if necessary, the camera 100 may further include a position determining unit 130, a communication unit 140, an encryption unit 150, and a memory 160. Hereinafter, it is assumed that the camera 100 includes the position determining unit 130. However, this is an example and the ECU 200 of the vehicle 1 may function as the position determining unit 130.

First, the camera 100 may be installed in any one of a plurality of installation locations of the vehicle 1. In this case, it is assumed that the position where the camera 1 will be installed is designated in advance.

For example, the camera 100 may be installed in any one of a first position corresponding to the front of the vehicle 1, a second position corresponding to the left side, a third position corresponding to the right side, and a fourth position corresponding to the rear side. Specifically, the first position may be a position between the first tire 11 and the second tire 12, the second position may be a position between the first tire 11 and the third tire 13, the third position may be a position between the second tire 12 and the fourth tire 14, and the fourth position may be a position between the third tire 13 and the fourth tire 14. Hereinafter, for the convenience of description, it is assumed that the first camera 101 is installed in the first position, the second camera 102 is installed in the second position, the third camera 103 is installed in the third position, and the fourth camera 104 is installed in the fourth position.

The image sensor 110 generates a driving image of the vehicle 1.

The receiving unit 120 receives the first to fourth RF signals which are transmitted from the first to fourth detecting sensors 21 to 24.

The position determining unit 130 determines a position where the camera 100 is installed, among the plurality of installation positions, based on the first to fourth RF signals received by the receiving unit 120.

To this end, first, the position determining unit 130 may measure a reception strength of the first to fourth RF signals. For example, the reception strength which is measured by the position determining unit 130 may be received signal strength indication (RSSI).

The first to fourth sensors 21 to 24 which are included in the TPMS sensor unit may insert unique IDs into the first to fourth RF signals, respectively. The unique ID may include the position information of the tire which includes the detecting sensor. When the unique ID for every detecting sensor is inserted into the first to fourth RF signals, the position determining unit 130 may determine the installation position of the camera 100 based on the unique ID for every detecting sensor, without measuring the reception strengths of the first to fourth RF signals.

The communication unit 140 may provide the driving image generated by the image sensor 110 or information on the installation position which is determined by the position determining unit 130 to various devices which are included in the vehicle 1. For example, the communication unit 140 may provide the driving image and the information on the installation position of the camera to an image output device 301 such as a navigation display, using the Ethernet.

The position determining unit 130 may extract first two RF signals in the descending order of reception strength (for example, RSSI), among the first to fourth RF signals. Further, the position determining unit 130 may determine a position where the camera 100 is installed, among the plurality of designated installation positions, using two extracted RF signals. The camera 100 may calculate the installation position of the camera 100 in accordance with the reception strength of the RF signal which is received by the TPMS sensor unit which will be described below. The camera 100 may be any one of the first camera 101, the second camera 102, the third camera 103, and the fourth camera 104 illustrated in FIG. 1.

For example, when the camera 100 is the first camera 101, the position determining unit 130 may determine that the installation position of the first camera 101 is the first position based on the first RF signal transmitted from the first detecting sensor 21 and the second RF signal transmitted from the second detecting sensor 22.

As another example, when the camera 100 is the second camera 102, the position determining unit 130 may determine that the installation position of the second camera 102 is the second position based on the first RF signal transmitted from the first detecting sensor 21 and the third RF signal transmitted from the third detecting sensor 23.

As another example, when the camera 100 is the third camera 103, the position determining unit 130 may determine that the installation position of the third camera 103 is the third position based on the second RF signal transmitted from the second detecting sensor 22 and the fourth RF signal transmitted from the fourth detecting sensor 24.

As another example, when the camera 100 is the fourth camera 104, the position determining unit 130 may determine that the installation position of the fourth camera 104 is the fourth position based on the third RF signal transmitted from the third detecting sensor 23 and the fourth RF signal transmitted from the fourth detecting sensor 24.

The memory 160 may store the unique IDs of the first to fourth detecting sensors 21 to 24. Further, the memory 160 may store the position of the tire which includes the detecting sensor corresponding to each ID. Further, the memory 160 may store the driving image generated by the image sensor 110 and the information on the installation position determined by the position determining unit 130.

Generally, the RF signal has a characteristic that a strength of a received signal is increased as a distance from the transmitting position is short. Therefore, when position data of the camera 100 is calculated, the position determining unit may extract first two RF signals in the descending order of reception strength, among the plurality of RF signals to determine the installation position of the camera 100.

The encryption unit 150 may encrypt the first to fourth RF signals which are received by the receiving unit 120. When the first to fourth RF signals are encrypted by the encryption unit 150, the position determining unit 130 may decrypt or decode the encrypted first to fourth RF signals. Therefore, stability of the RF signals which are wirelessly transmitted may be secured.

The communication unit 140 may server as an interface to transmit and receive the driving image between the camera 100 and the vehicle 1 and information on the installation position of the camera 100. The vehicle 1 may include a communication unit (not illustrated) which transmits and receives various data or information to and from the communication unit 140 of the camera 100.

The communication unit 140 may communicate with the vehicle 1 using at least one of a controller area network (CAN), a low-voltage differential signaling (LVDS), and the Ethernet.

When a user inputs a specific installation position through an input unit (not illustrated) of the vehicle 1, the vehicle 1 may display a driving image which is provided from the camera 100 which is installed in the installation position input by the user on a screen of the image output device 301.

In the meantime, the ECU 200 of the vehicle 1 may output a control signal which instructs the TPMS sensor unit to transmit the RF signal, to the TPMS sensor unit.

Figure 3A:
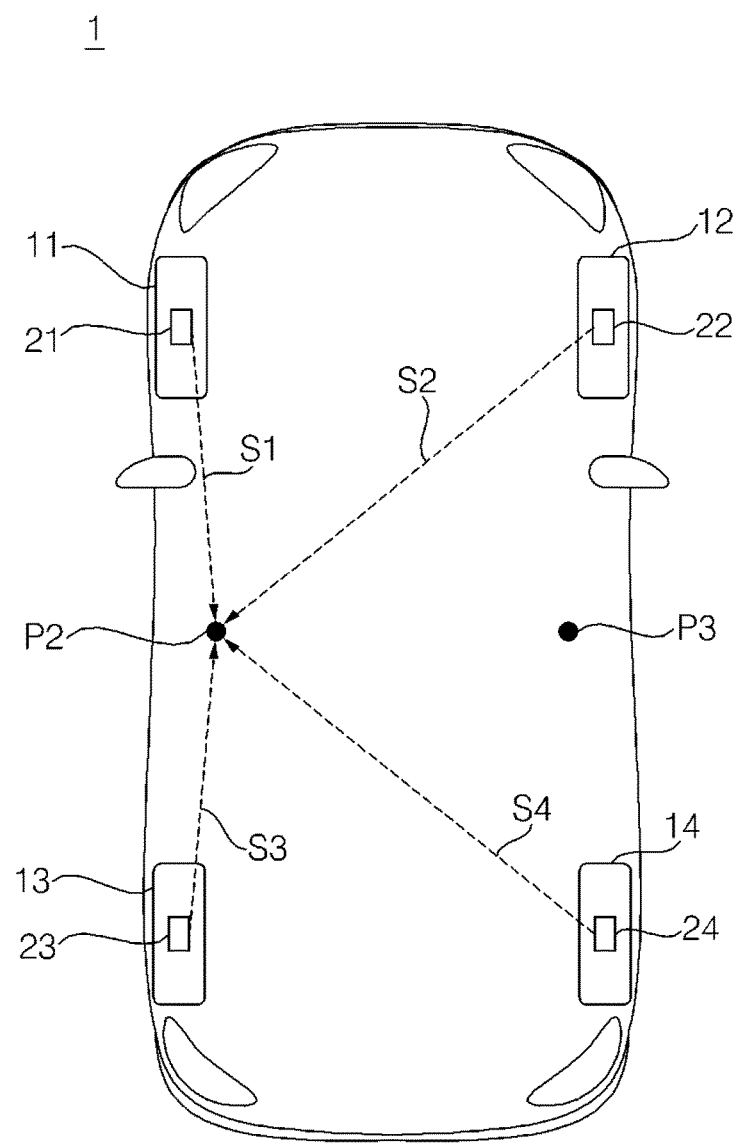
FIGS. 3A to 3C illustrate an example in which a camera determines its installation location according to an exemplary embodiment of the present invention.
Figure 3B:
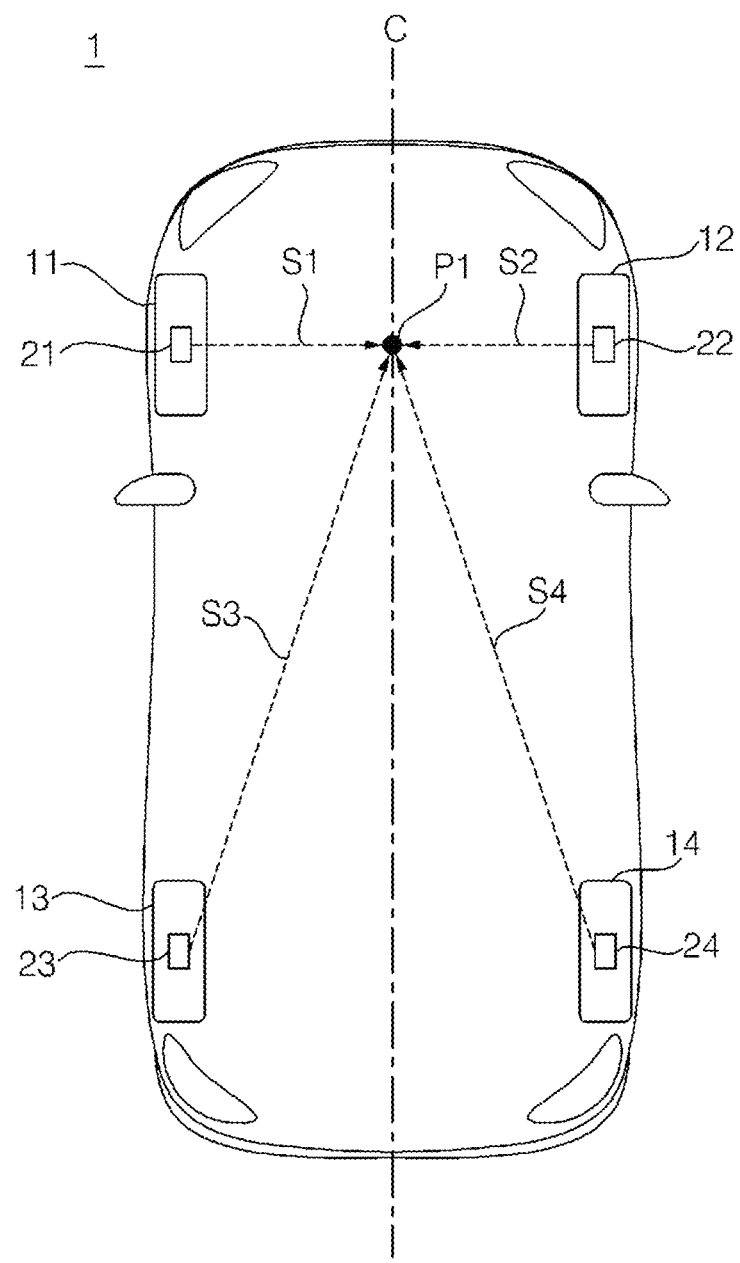
Figure 3C:
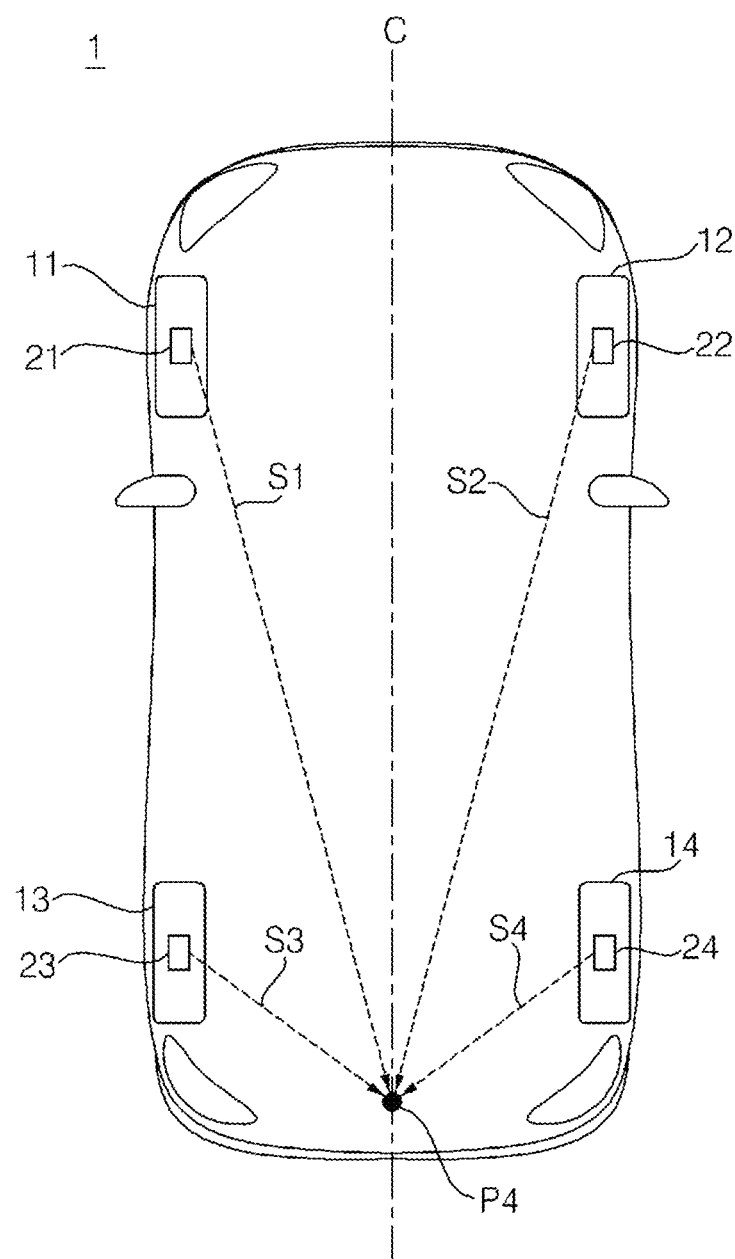

FIGS. 3A to 3C illustrate an example in which the camera 100 determines its installation location according to an exemplary embodiment of the present invention. For the convenience of description, installation positions are illustrated in the form of points and the cameras 100 which are installed in the installation positions are not illustrated.

Referring to FIG. 3A, the camera 100 may be installed in a second position P2 between the first tire 11 and the third tire 13. For example, the second position P2 may be one point of a left side mirror.

In this case, the camera 100 is relatively closer to the first detecting sensor 21 and the third detecting sensor 23 than the second detecting sensor 22 and the fourth detecting sensor 24. Therefore, among the first to fourth RF signals S1 to S4, the reception strengths of the first and third RF signals S1 and S3 correspond to the first two signals.

The first RF signal S1 includes left and right position information corresponding to the left side and the third RF signal S3 also includes left and right position information corresponding to the left side. That is, since both the left and right position information included in the first two RF signals which are extracted in the descending order of reception strength (for example, RSSI) correspond to the left sides, the camera 100 may determine that its' own installation position is currently the second position P2 between the first tire 11 at the front left side and the third tire 13 at the rear left side.

Even though not illustrated, when the camera 100 is installed in the third position P3 between the second tire 12 and the fourth tire 14, the camera 100 may determine that its installation position is the third position P3 by the same method.

In FIGS. 3B and 3C which will be described below, for the convenience of description, it is assumed that the first position P1 and the fourth position P4 are located on the center line C of the vehicle 1 and a distance from the first position P1 to the first detecting sensor 21 is shorter than a distance from the fourth position P4 to the third detecting sensor 23.

Referring to FIG. 3B, the camera 100 may be installed in the first position between the first tire 11 and the second tire 12. For example, the first position may be one point at an upper end of a wind shield.

In this case, the camera 100 is relatively closer to the first detecting sensor 21 and the second detecting sensor 22 than the third detecting sensor 23 and the fourth detecting sensor 24. Therefore, among the first to fourth RF signals S1 to S4, the reception strengths of the first and second RF signals S1 and S2 correspond to the first two signals.

The first RF signal S1 includes left and right position information corresponding to the left side and the second RF signal S2 also includes left and right position information corresponding to the right side. That is, since one of the left and right position information included in the first two RF signals which are extracted in the descending order of reception strength (for example, RSSI) corresponds to the left position information and the other corresponds to the right position information, the camera 100 needs to determine which of the first position P1 and the fourth position P4 is the installation position of the camera 100.

In the meantime, when it is assumed that a distance from the first position P1 to the first detecting sensor 21 is the same as a distance from the first position to the second detecting sensor 22, a reception strength of the first RF signal S1 which is measured in the first position P1 is equal to a reception strength of the second RF signal S2. Therefore, the camera 100 may compare any one of the reception strength of the first RF signal S1 and the reception strength of the second RF signal S2 with a predetermined reference value.

Here, the reference value may be set to be a value between the reception strength of the first RF signal S1 measured in the first position P1 and the reception strength of the third RF signal S3 measured in the fourth position P4.

When a reception strength which is higher than the reference value is measured, the position determining unit 130 may be set in advance to determine that the installation position of the camera 100 is the first position P1.

In this case, since the reception strengths of the first RF signal S1 and the second RF signal S2 which are measured by the camera 100 in the first position P1 become higher than the reference value, the camera 100 may determine that the installation position of the camera 100 is the first position P1 between the first position P1 and the fourth position P4.

Referring to FIG. 3C, the camera 100 may be installed in the fourth position between the third tire 13 and the fourth tire 14. For example, the fourth position may be one point at a center of a trunk.

In this case, the camera 100 is relatively closer to the first detecting sensor 21 and the second detecting sensor 22 than the third detecting sensor 23 and the fourth detecting sensor 24. Therefore, among the first to fourth RF signals S1 to S4, the reception strengths of the third and fourth RF signals S3 and S4 correspond to the first two signals.

In the meantime, the third RF signal S3 includes left and right position information corresponding to the left side and the fourth RF signal S4 also includes left and right position information corresponding to the right side. That is, since one of the left and right position information included in the first two RF signals which are extracted in the descending order of reception strength (for example, RSSI) corresponds to the left side and the other corresponds to the right side, the camera 100 needs to determine which one of the first position P1 and the fourth position P4 is the installation position of the camera 100.

In the meantime, when it is assumed that a distance from the third position P3 to the third detecting sensor 23 is equal to a distance from the third position P3 to the fourth detecting sensor 24, a reception strength of the third RF signal S3 which is measured in the third position P3 is equal to a reception strength of the fourth RF signal S4. Therefore, the camera 100 may compare any one of the reception strength of the third RF signal S3 and the reception strength of the fourth RF signal S4 with the predetermined reference value.

Here, as described above, the reference value may be set to be a value between the reception strength of the first RF signal S1 measured in the first position P1 and the reception strength of the third RF signal S3 measured in the fourth position P4.

When a reception strength which is lower than the reference value is measured, the position determining unit 130 may be set in advance to determine that the installation position of the camera 100 is the fourth position P4.

In this case, the reception strengths of the third RF signal S3 and the fourth RF signal S4 which are measured by the camera 100 in the fourth position P4 are lower than the reference value. The camera 100 may determine that the installation position of the camera 100 is the fourth position S4 among the first position P1 and the fourth position P4.

Hereinafter, a method of controlling a camera for a vehicle according to an exemplary embodiment of the present invention will be described with reference to FIG. 4.

Figure 4:
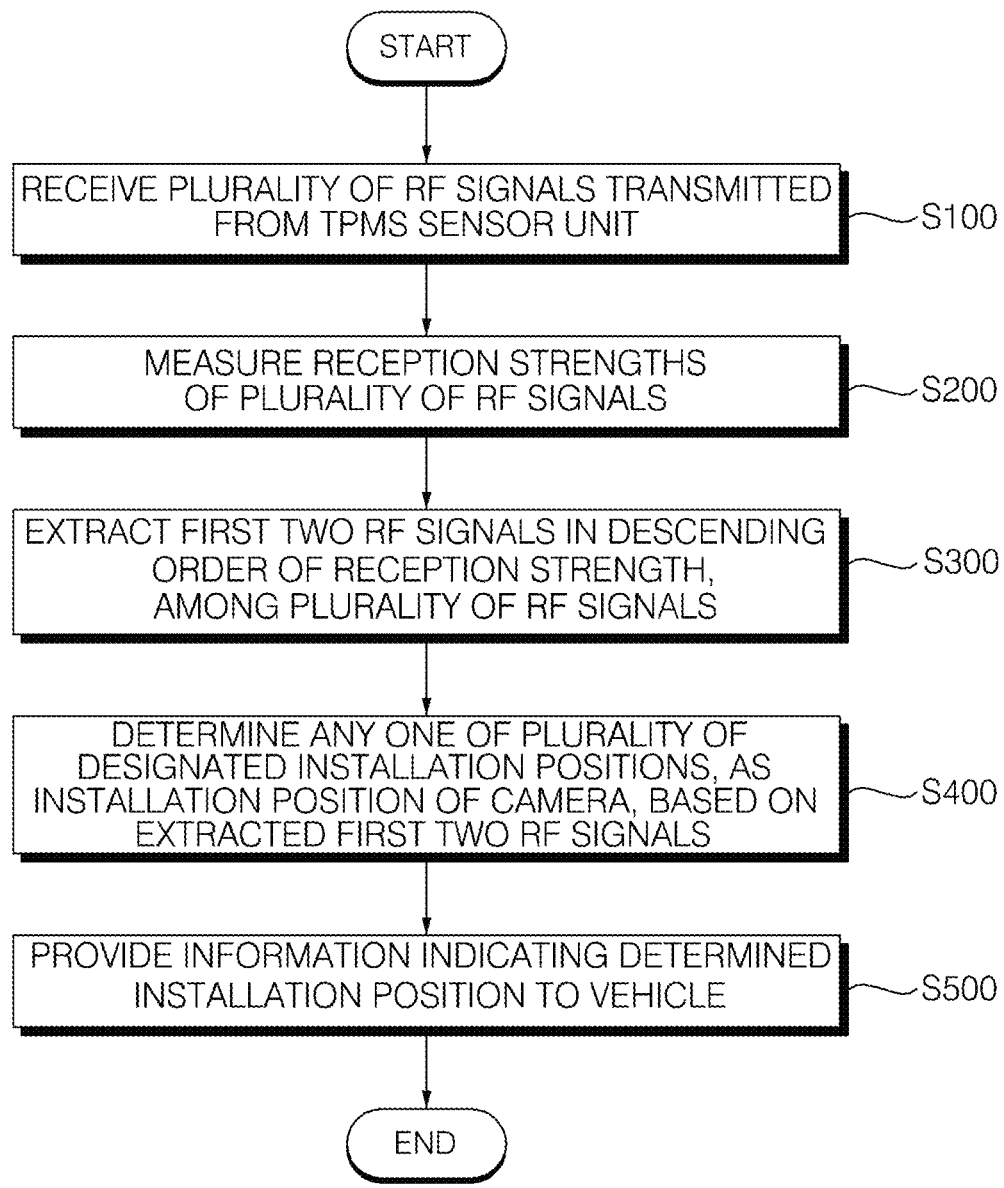

FIG. 4 is a flowchart illustrating a method of controlling a camera 100 for a vehicle according to an exemplary embodiment of the present invention.

First, the camera 100 receives a plurality of RF signals which are transmitted from a TPMS sensor unit which detects states of the plurality of tires included in the vehicle 1 in step S100. For example, when the ECU 200 of the vehicle 1 transmits a signal to instruct the first to fourth detecting sensors 21 to 24 which are provided in four tires 11 to 14 to transmit the RF signals, the first to fourth detecting sensors 21 to 24 transmit the first to fourth RF signals and the receiving unit 120 of the camera 100 may receive the first to fourth RF signals. In this case, as described above, the first to fourth RF signals may include the left and right position information in addition to state information (for example, an air pressure and a temperature) of the tires 11 to 14.

Next, the camera 100 measures reception strengths of the plurality of received RF signals in step S200. Specifically, the position determining unit 130 of the camera 100 may individually measure the reception strengths of the plurality of RF signals which is received by the receiving unit 120. Alternatively, the position determining unit 130 extracts IDs for every detecting sensor which is inserted into each of the plurality of RF signals and determines a detecting sensor which transmits the RF signal.

Next, the camera 100 may extract first two RF signals from the plurality of RF signals in the descending order of reception strength in step S300. That is, the position determining unit 130 may filter the plurality of RF signals which is received in step S200 in accordance with the reception strength.

Thereafter, the camera 100 determines any one of the plurality of designated installation positions as an installation position of the camera 100, based on the two RF signals which are extracted in step S300 in step S400, which will be separately described with reference to FIG. 5.

Next, the camera 100 provides information indicating the installation position which is determined in step S400 to the vehicle in step S500. For example, the position determining unit 130 may provide the information on the installation position of the camera 100 to the ECU 200 of the vehicle 1 or an image display device (for example, a navigation display).

Here, step S400 will be described in more detail with reference to FIG. 5. For the convenience of description, as illustrated in FIGS. 3B and 3C, it is assumed that the first position P1 and the fourth position P4 are located on the center line C of the vehicle. Further, when it is assumed that a distance from the first position P1 to the first detecting sensor 21 is shorter than a distance from the fourth position P4 to the third detecting sensor 23, since the reception strength of the first RF signal which is measured in the first position P1 is larger than the reception strength of the third RF signal which is measured in the fourth position P4, the reference value may be set to be a value between the reception strength of the first RF signal measured in the first position P1 and the reception strength of the third RF signal measured in the fourth position P4.

First, the position determining unit 130 checks left and right position information which is included in the first two RF signals which are extracted in step S300, in step S401. In this case, the left and right position information is information indicating which of the left tire or the right tire includes a detecting sensor which transmits an RF signal. For example, a direction corresponding to the left and right position information which is included in the RF signal transmitted by the first tire 11 which is provided at the front left side may be the left side. In another example, a direction corresponding to the left and right position information which is included in the RF signal transmitted by the fourth tire 14 which is provided at the rear right side may be the right side.

Next, the position determining unit 130 determines whether all the left and right position information which is included in two RF signals correspond to the left side in step S402.

When all the left and right information included in two RF signals corresponds to the left side in step S402, the position determining unit 130 determines that the installation position of the camera 100 is the second position P2 in step S403. For example, referring to FIG. 3A, when all of two left and right position information correspond to the left side, it means that the current installation position of the camera 100 is between the first detecting sensor 21 and the third detecting sensor 23.

In the meantime, in step S402, when at least one of the left and right position information included in two RF signals does not correspond to the left side, the position determining unit 130 determines whether all the left and right position information included in two RF signals corresponds to the right side in step S404.

When all the left and right information included in two RF signals correspond to the right side in step S404, the position determining unit 130 determines that the installation position of the camera 100 is the third position P3 in step S405. When all of two left and right position information correspond to the right side, it means that the current installation position of the camera 100 is between the second detecting sensor 22 and the fourth detecting sensor 24.

In the meantime, in step S404, when any one of the left and right position information included in two RF signals does not correspond to the right side, the position determining unit 130 determines whether the reception strengths of the two RF signals are higher than a predetermined reference value in step S406. For example, referring to FIGS. 3B and 3C, when one of the left and right position information included in two RF signals corresponds to the left side and the other one corresponds to the right side, in order to determine which one of the first position P1 and the fourth position P4 is the current installation position of the camera 100, the position determining unit 130 may compare at least one of the reception strengths of the two RF signals with the predetermined reference value.

When the reception strengths of the two RF signals are higher than the reference value in step S406, the position determining unit 130 determines that the current installation position of the camera 100 is the first position P1 in step S407. In contrast, when the reception strengths of the two RF signals are lower than the reference value in step S406, the position determining unit 130 determines that the current installation position of the camera 100 is the fourth position P4 in step S408.

In the meantime, even though in FIGS. 1 to 5, it is described that the camera 100 determines the installation position thereof by itself, the present invention is not limited thereto. For example, the position determining unit 130 may be a component which is included not in the camera 100, but in the vehicle 1. Specifically, when the position determining unit 130 is a component of the vehicle 1 which is not included in the camera 100, the camera 100 provides information on the plurality of RF signals which is received by the receiving unit 120 to the vehicle and the position determining unit 130 included in the vehicle may determine the installation position of the camera 100, based on information on the plurality of RF signals.

According to the camera 100 of a vehicle according to the exemplary embodiment of the present invention which is configured as described above and the control method thereof, the camera 100 may determine the installation position thereof by itself through the wireless transception between the camera 100 and the TPMS sensor unit and provide the information on the determined installation position to the vehicle 1. Therefore, a driving image for a direction which is requested by the user may be provided and the number of components of the camera 100 for a vehicle may be reduced and process simplification and convenience may be improved, a weight is reduced due to the reduced number of components and cost may be saved.

In the camera 100 for a vehicle and a control method thereof according to the exemplary embodiment, the configuration and method of embodiments as described above may not be applied with limitation, but the embodiments may be configured by selectively combining all or a part of each embodiment such that various modifications may be made.

Exemplary embodiments of the present invention have been illustrated and described above, but the present invention is not limited to the above-described specific embodiments, it is obvious that various modifications may be made by those skilled in the art, to which the present invention pertains without departing from the gist of the present invention, which is claimed in the claims, and such modifications should not be individually understood from the technical spirit or prospect of the present invention.

What is claimed is:

1. A camera for a vehicle which is provided in any one of a plurality of designated installation positions of the vehicle, the camera comprising:
   an image sensor which generates a driving image;
   a receiving unit which receives a plurality of RF signals which are transmitted from sensors of a Tire Pressure Monitoring System (TPMS) sensor unit which detects states of a plurality of tires included in the vehicle; and
   a position determining unit which determines a position where the camera is installed, among the plurality of installation positions, based on the plurality of RF signals which is received by the receiving unit.

2. The camera of claim 1, further comprising:
   a memory which stores the driving image and information indicating the determined installation position.

3. The camera of claim 1, further comprising:
   a communication unit which provides the driving image and the information indicating the determined installation position to an image display device of the vehicle.

4. The camera of claim 3, wherein the communication unit provides the driving image and information on the determined installation position to the image display device of the vehicle using at least one of a controller area network (CAN), a low-voltage differential signaling (LVDS), and Ethernet.

5. The camera of claim 1, wherein the vehicle includes a first tire which is located at a front left side, a second tire which is located at a front right side, a third tire which is located at a rear left side, and a fourth tire which is located at a rear right side,
   the TPMS sensor unit includes a first detecting sensor which is provided in the first tire and transmits a first RF signal including state information of the first tire; a second detecting sensor which is provided in the second tire and transmits a second RF signal including state information of the second tire, a third detecting sensor which is provided in the third tire and transmits a third RF signal including state information of the third tire; and a fourth detecting sensor which is provided in the fourth tire and transmits a fourth RF signal including state information of the fourth tire, the first to fourth RF signals include left and right position information and are transmitted with the same strength, and the plurality of installation positions is a first position between the first tire and the second tire, a second position between the first tire and the third tire, a third position between the second tire and the fourth tire, and a fourth position between the third tire and the fourth tire.

6. The camera of claim 5, wherein the receiving unit measures RSSIs of the first to fourth RF signals, and the position determining unit extracts first two RF signals among the first to fourth RF signals in the descending order of RSSI and determines a position where the camera is installed, among the plurality of installation positions, using the two extracted RF signals.

7. The camera of claim 6, wherein when all the left and right position information included in the first two RF signals which are extracted in the descending order of RSSI corresponds to the left side, the position determining unit determines that the installation position of the camera is the second position and when all the left and right position information included in the first two RF signals which are extracted in the descending order of RSSI corresponds to the right side, the position determining unit determines that the installation position of the camera is the third position.

8. The camera of claim 6, wherein when the left and right position information included in any one of the first two RF signals which are extracted in the descending order of RSSI corresponds to the left side and the left and right position information included in the other one corresponds to the right side, if the first two RF signals which are extracted in the descending order of RSSI have a first strength, the position determining unit determines that the installation position of the camera is the first position and if the first two RF signals which are extracted in the descending order of RSSI have a second strength, the position determining unit determines that the installation position of the camera is the fourth position.

9. The camera of claim 1, further comprising:
an encryption unit which encrypts the RF signal.

10. A control method of a camera for a vehicle, comprising:
receiving a plurality of RF signals which are transmitted from sensors of a Tire Pressure Monitoring System (TPMS) sensor unit which detects states of a plurality of tires included in the vehicle;
measuring reception strengths of the plurality of RF signals;
extracting first two RF signals, among the plurality of RF signals, in the descending order of reception strength;
determining a position where the camera is installed, among the plurality of installation positions, based on the first two RF signals which are extracted in the descending order of strength; and
providing the information indicating the determined installation position to the vehicle.

11. The control method of claim 10, wherein when information indicating the determined installation position is provided to the image display device of the vehicle, image data photographed by the camera is also provided.

12. The control method of claim 10, wherein the vehicle includes a first tire which is located at a front left side, a second tire which is located at a front right side, a third tire which is located at a rear left side, and a fourth tire which is located at a rear right side, the TPMS sensor unit includes a first detecting sensor which is provided in the first tire and transmits a first RF signal including state information of the first tire; a second detecting sensor which is provided in the second tire and transmits a second RF signal including state information of the second tire, a third detecting sensor which is provided in the third tire and transmits a third RF signal including state information of the third tire; and a fourth detecting sensor which is provided in the fourth tire and transmits a fourth RF signal including state information of the fourth tire, the first to fourth RF signals include left and right position information and are transmitted with the same strength, and the plurality of installation positions is a first position between the first tire and the second tire, a second position between the first tire and the third tire, a third position between the second tire and the fourth tire, and a fourth position between the third tire and the fourth tire.

\* \* \* \* \*